United States Patent
Schreurs et al.

(10) Patent No.: US 8,534,733 B2
(45) Date of Patent: Sep. 17, 2013

(54) SLIDING GUIDE AND ARM SUPPORT PROVIDED WITH SUCH A SLIDING GUIDE

(75) Inventors: Roger Maria Jozef Schreurs, Meerssen (NL); Hendricus Tadeusz Wojcik, Eijsden (NL)

(73) Assignee: Thomas Regout International B.V., Maastricht (NL)

( * ) Notice: Subject to any disclaimer, the term of this patent is extended or adjusted under 35 U.S.C. 154(b) by 209 days.

(21) Appl. No.: 13/002,385

(22) PCT Filed: Jul. 3, 2009

(86) PCT No.: PCT/NL2009/050400
§ 371 (c)(1),
(2), (4) Date: Jan. 27, 2011

(87) PCT Pub. No.: WO2010/002261
PCT Pub. Date: Jan. 7, 2010

(65) Prior Publication Data
US 2011/0169288 A1    Jul. 14, 2011

(30) Foreign Application Priority Data
Jul. 4, 2008   (NL) ..................................... 2001766

(51) Int. Cl.
*B60R 13/00*    (2006.01)
(52) U.S. Cl.
USPC ....................................... 296/24.34; 296/1.09
(58) Field of Classification Search
USPC ........... 296/24.34, 1.09; 297/188.19, 411.21, 297/411.37; 224/281
See application file for complete search history.

(56) References Cited

U.S. PATENT DOCUMENTS

| | | | |
|---|---|---|---|
| 6,250,729 B1 * | 6/2001 | Allison et al. | 312/324 |
| 7,481,475 B1 * | 1/2009 | Lim et al. | 296/24.34 |
| 7,731,258 B2 * | 6/2010 | Bazinski et al. | 296/37.8 |
| 8,162,369 B2 * | 4/2012 | Tsuda et al. | 296/24.34 |
| 2002/0089217 A1 * | 7/2002 | Scheerhorn | 297/188.19 |
| 2006/0279123 A1 * | 12/2006 | Bazinski et al. | 297/411.35 |
| 2010/0201147 A1 * | 8/2010 | Jones et al. | 296/24.34 |
| 2011/0215605 A1 * | 9/2011 | Spitler et al. | 296/24.34 |

FOREIGN PATENT DOCUMENTS

| | | |
|---|---|---|
| EP | 1 348 593 | 10/2003 |
| EP | 1 400 401 | 3/2004 |
| EP | 1 733 916 | 12/2006 |
| JP | 2005 021289 | 1/2005 |
| WO | WO 2005/035303 | 4/2005 |

* cited by examiner

*Primary Examiner* — Jason S Morrow
(74) *Attorney, Agent, or Firm* — Preti Flahery Beliveau & Pachios LLP

(57) ABSTRACT

A sliding guide, for instance for an arm support (A), comprising at least a first and an at least second profile, with bearing and friction elements included therebetween for providing a particular frictional resistance between the profiles, wherein the profiles are provided with fastening elements, wherein the first and second profiles on both sides in the longitudinal direction are provided with respective connecting longitudinal edges, which cooperate in order to allow sliding of the second profile relative to the first profile, wherein the bearing and the friction elements are provided between the profiles near the respective connecting longitudinal edges thereof in order to provide an internal space (I) between the at least first and the at least second profile. The invention further relates to an arm support (A) provided with such a sliding guide.

27 Claims, 2 Drawing Sheets

SLIDING GUIDE AND ARM SUPPORT PROVIDED WITH SUCH A SLIDING GUIDE

FIELD OF THE INVENTION

The invention relates to a sliding guide, for instance for an arm support, provided with bearing means for sliding at least two profiles relative to each other over a particular sliding distance and with friction means for providing a certain frictional resistance between the profiles over at least a portion of the sliding distance. Such a sliding guide is known from practice.

BACKGROUND OF THE INVENTION

A known sliding guide can be used in arm supports which, for instance, may be provided between two front seats in vehicles, such as passenger cars, in order to provide an adjustable arm support for a driver and/or for a passenger in the vehicle. This may be desirable from an ergonomic viewpoint, so that, for instance depending on the position of the seat and the size of the driver, a desired support of the body can be achieved, which is conducive to seating comfort.

Such a sliding guide can for instance comprise a first profile and a second profile, which are slidably connected with each other via respective connecting longitudinal edges in longitudinal direction provided on both sides of the profiles. The sliding guide further comprises fastening means. One of the profiles can be fastened therewith onto the console, and the other profile can be fastened therewith to a bottom surface of an arm support placed on the console and to be adjusted.

The known sliding guide is arranged to transmit force from the arm support to the console for instance situated between the two front seats of a vehicle. The sliding guide further comprises bearing means provided with a ball bearing cage near both connecting longitudinal edges for guiding the first profile relative to the second profile in the longitudinal direction thereof. The bearing means are placed between the first and the second profile, while the first profile is also movable in the longitudinal direction relative to the bearing means. Further, for the purpose of providing the frictional resistance, the sliding guide provides friction means which are provided between the first profile and the second profile. The friction means comprise a rotation damper which is fastened to a side of the profile central surface of the first profile that faces the second profile. Placed on the profile central surface of the second profile situated opposite thereto is a tooth rack extending in the longitudinal direction of the profile, which engages the rotation damper. The bearing means and the friction means are situated in an internal space between the first and the second profile.

This known sliding guide comprises relatively many parts and is particularly complicated in construction and difficult to mount. Due to the amount of parts and the complicated construction, it is not possible to add any additional parts, for instance depending on the manner of fastening of the sliding guide on a surface, depending on the wishes of a user or, for instance, depending on safety requirements for a particular application of the sliding guide.

EP1733916 describes an arm support provided with a guide for sliding the arm support, with a first profile sliding relative to a second profile, with interposition of moving bearing means and friction means. A separate provision is arranged to avoid play. A comparable device is known from JP2005021289.

U.S. Pat. No. 6,007,155 describes a central console for a car, provided with a slidable arm support with an anti-rattle guide assembly. In this device a first profile is retained in a manner slidable in a first direction in a sliding guide formed on a second profile. On the second profile, to that end, at least a first wedge-shaped block is provided, from which a surface of the first profile that inclines with respect to the first direction faces away. A second wedge-shaped block has been laid by an inclined surface thereof against said inclined surface of the first block and is pressed-on by a spring. The blocks are confined between the first profile and a partition extending parallel thereto. The first block can move in a second direction, at right angles to the first direction, while the second block can move parallel to the first direction. The spring continuously acts in the first direction, and hence continuously exerts a force on the second block, parallel to the first direction. The first block and an opposite part of the guide, together with the first profile, form a sliding guide. In a first embodiment, on opposite sides of the first profile a first and a second block are provided, in a second embodiment on just one side two first and two second blocks are provided, with the spring extending between the two blocks, parallel to the first direction. A disadvantage of this known device is that it is complicated in construction, comprises many parts and needs to be tuned accurately. A further disadvantage of this known device is that the spring acts parallel to the first direction and presses on the first block only indirectly. A further disadvantage is that the use of the wedge-shaped blocks and the guide of the or each first block can entail the possibility of the or each first block tilting to some extent about an axis at right angles to the first direction and to the second profile, so that a first end of the block will be pressed more strongly against the first profile than an opposite second end, for instance through friction between the block and the first profile, so that the first profile can be displaced no longer or only with high force. This can occur especially in case of soiling or high frictional resistance between the block and the first profile and in case of wear or inaccuracies of the guide of the or a first block or second block. A still further disadvantage of this known device is that when a guiding surface of the first profile is not entirely straight or the guide surfaces of the first profile do not extend entirely parallel to each other, the or each first block will have difficulty following this because to that end the second block needs to be pushed away, against the spring action, with the aid of the inclined surfaces, which results in an unwanted force transmission.

SUMMARY OF THE INVENTION

The object of the invention is to provide a sliding guide of the type described in the preamble, in which the disadvantages mentioned have been removed or at least have been reduced, while maintaining the advantages thereof. To this end, the invention provides a sliding guide, for instance for an arm support, comprising at least a first and an at least second profile slidable relative thereto in a longitudinal direction, with bearing means and friction means included therebetween for providing a particular frictional resistance between the first profile and the second profile during sliding, wherein the profiles are provided with fastening means for fastening the profiles to respective surfaces situated opposite thereto, wherein the first and second profiles on opposite sides thereof in the longitudinal direction thereof are provided with respective connecting longitudinal edges which cooperate in order to enable sliding of the second profile relative to the first profile, characterized in that the bearing means and the friction means are provided between the profiles near the respective connecting longitudinal edges thereof in order to provide an internal space between the at least first and the at least second profile.

In a sliding guide according to the invention, both the frictional resistance and the bearing of the first profile with respect to the second profile is determined by the bearing means and friction means provided near the connecting longitudinal edges of the respective profiles. As these means are provided in whole near outer connecting longitudinal edges of the first and the at least second profile, the space between the profiles is not needed for housing parts that are necessary for providing the frictional resistance or the bearing. As a result, between the profiles an internal space to be freely used is created. Such a free space can be used for arranging extra parts on the sliding guide. Thus, for instance, different kinds of fastening means can be used which extend to some extent into the space between the profiles. This enables a flexibly deployable sliding guide for different applications, which can easily be adjusted to wishes of the user. Also, the internal space can be used for adding, for instance, safety provisions. Such provisions can comprise blocking means which block the profiles with respect to each other in case of an unwanted impulse on the sliding guide, so that the sliding movement cannot take place. Such safety provisions may be desired when the sliding guide is used in a vehicle, for instance in an arm support provided in the vehicle. A sliding guide according to the invention comprises a small number of parts and can be manufactured in a simple manner at relatively low cost. Further, the chances of errors during assembly are relatively low in that the sliding guide has a simple construction. A further advantage of the small number of parts of the sliding guide is that the sliding guide is simple to galvanize or paint so that the corrosion resistance of the sliding guide is augmented. This makes it possible for the sliding guide to be used in a corrosion-sensitive environment. The small number of parts and the relatively simple construction of the sliding guide are furthermore favorable to the total weight of the sliding guide, which may be relevant for the kind of application thereof, for instance for use in the car industry. The weight may further be reduced if one or a few different parts of the sliding guide are manufactured from light materials, for instance from aluminum. Also, the overall height of the sliding guide according to the invention is limited owing to the simple construction.

To obtain a largest possible internal space to be freely used between the profiles, it is favorable if, in a further elaboration of the invention, the respective connecting longitudinal edges of the first and of the second profile extend at least partly from a profile central surface substantially to the profile situated opposite thereto. With such a construction of the sliding guide, the profile central surfaces of the respective profiles, which bound the internal space on at least two opposite sides, are at a relatively great distance from each other.

According to a further elaboration of the invention, the bearing means can comprise at least one sliding element, wherein the at least one sliding element is provided between at least one connecting longitudinal edge of the first profile and the connecting longitudinal edge of the second profile situated opposite thereto. Such a sliding element can for instance be made of a plastic. This is favorable for reduction, or prevention, of any objectionable noise when sliding the sliding guide in and out, which objectionable noise can occur when using a ball bearing in view of the fact that metal moves over metal then. An advantage of the use of such a sliding element is that the use of a lubricant such as grease is not necessary, in contrast to the situation where ball bearing is used, as in the sliding guide according to the prior art described above. Owing to the absence of the lubricant in the sliding guide according to the invention, the sliding guide is less sensitive to dirt, such as dust, and less temperature sensitive. In the use of ball bearing, as in the sliding guide according to the prior art described, the surface pressure between the respective balls of the ball bearing and the connecting longitudinal edge situated thereagainst is relatively high. This can result, for instance when the sliding guide is exposed to vibrations, in deformations such as pinholes in the connecting longitudinal edge, which is undesired for a smooth sliding movement between the profiles. By making use of at least one sliding element in the sliding guide, the occurrence of deformations in case of vibrations or other motions is reduced or even prevented since the surface pressure of the sliding element on the connecting longitudinal edge is relatively small, in any case many times smaller than the above-mentioned surface pressure of the balls in the ball bearing. The sliding element, according to a further elaboration of the invention, can have a substantially equal length to the first profile, at any rate to the connecting longitudinal edge of the first profile. In another embodiment of the invention, it is also possible that several sliding elements are provided between the connecting longitudinal edge of the first profile and the connecting longitudinal edge of the second profile, with the sliding elements being situated in line with each other in the longitudinal direction of the profiles.

To further limit the number of parts of the sliding guide and to further simplify the construction of the sliding guide, it is favorable when the bearing means and the friction means, according to a further aspect of the invention, are integrated in at least one sliding element. However, in an alternative embodiment of the invention, it is also possible that the sliding element is solely arranged for bearing of the first profile with respect to the second profile. The frictional resistance in that case can be provided using for instance a friction element which is provided between the profile central surface of the first profile and the profile central surface of the second profile. Preferably, such a friction element extends approximately perpendicularly to the profile central surfaces, preferably near the connecting longitudinal edges, in order to create a largest possible internal space between the profiles.

In a further elaboration of the invention, the at least one connecting longitudinal edge of the second profile has a substantially V-shaped cross section, which tapers, for instance in a direction remote from the first profile. By the use of such a V-shaped cross section of the connecting longitudinal edges of the second profile, a good positioning of the sliding element in the connecting longitudinal edge situated opposite thereto, viewed in the plane of the cross section, is obtained. Such a positioning limits play between the sliding element and the connecting longitudinal edge. This is for instance favorable when the sliding guide is used in the earlier-mentioned arm support. Movement between the arm support and the console is minimized in this way, which is favorable from the viewpoint of comfort and soundness of the arm support. Such advantages can also be achieved if the cross section, in another embodiment of the invention, has a different shape, such as a semicircular cross section, which shape of the cross section in any case brings about the effect that the sliding element is positioned in the plane of the cross section substantially in one or more directions. It is also possible, in yet another embodiment of the invention, that the cross section converges, for instance tapers when the cross section is V-shaped, in a direction from the second profile to the first profile. The shape of the sliding element can optionally be adjusted to the cross section of the connecting longitudinal edges to obtain the desired positioning.

To further improve the positioning of the sliding element with respect to the connecting longitudinal edge of the second profile and also to augment the frictional resistance therebetween, according to a further embodiment of the invention, the at least one sliding element can have a first side facing the first profile, which is connected with the connecting longitudinal edge of the first profile via a spring connection.

Also, it is favorable that the at least one sliding element, in a further elaboration of the invention, has a second side facing an inner surface of the connecting longitudinal edge of the second profile, which second side is situated substantially against the inner surface and is arranged for sliding cooperation with the inner surface. It is then particularly favorable if according to a further aspect of the invention, an outer surface of the second side of the sliding element abuts in a substantially form-closed manner against the inner surface of the connecting longitudinal edge of the second profile. By the use of a spring connection, the sliding element is pressed against the inner surface of the connecting longitudinal edge of the second profile situated opposite thereto. As a result, the first profile is, as it were, clamped between the respective connecting longitudinal edges of the second profile. The frictional resistance between the first and the second profile is at least partly determined by the spring force of the spring connection. The spring connection can for instance comprise a compression spring, a leaf spring or other kind of spring. Also, the spring connection may be formed with the aid of the material of the sliding element, optionally depending on the design of the sliding element. The frictional resistance may further be determined by other factors, such as the geometry of the sliding element, the material from which the sliding element is made, surface roughnesses of the sliding element and/or the length of the sliding element. By changing one or a few of these parameters, the frictional resistance can be changed. In another embodiment of the invention, the frictional resistance can be determined by a layer of grease between the sliding element and the connecting longitudinal edge of the second profile. In this embodiment of the invention, there is no necessity for a spring connection between the sliding element and the connecting longitudinal edge of the first profile.

In an alternative embodiment of the sliding guide according to the invention, the sliding element may be connected via a spring connection with an inner surface of the second profile, wherein a side of the sliding element facing the first profile is arranged for slidingly receiving the first profile, at least the connecting longitudinal edge thereof, at least partly. In such a design of the invention, the sliding element preferably has a substantially equal length to the connecting longitudinal edge of the second profile and is preferably provided with a receiving portion extending in longitudinal direction of the sliding element, on a side facing the first profile, through which the first profile is slidable in longitudinal direction.

To provide a flexibly applicable sliding guide which is easy to adapt to the use thereof, it is favorable if the frictional resistance between the first and the second profile, according to a further elaboration of the invention, is settable. Setting the frictional resistance can be realized in different ways. For instance, several springs may be provided between the connecting longitudinal edge and the sliding element, or the type of spring and spring stiffness of the spring may be varied. Also, it may be possible to provide or raise the spring pressure by reducing the distance between the connecting longitudinal edge and the sliding element, at least adjacent the attachment points of the spring. This may optionally be done in assembled condition of the sliding guide in a manner known to the skilled person, for instance using a setting screw.

In a further elaboration of the invention, the sliding guide may be provided with at least one end blocking which determines a maximum sliding distance of the second profile with respect to the first profile. A favorable embodiment of such an end blocking provides at least one stop which is provided on at least one of the profiles, wherein the stop is preferably of a damping material such as rubber, and wherein the profile situated opposite thereto is provided with at least one projection situated opposite the at least one stop. Such an end blocking determines the maximum sliding distance, also referred to as stroke, of the sliding guide. Providing the stop with a damping material at least on an outer side thereof prevents, at least partially, an undesired noise being produced upon complete sliding-out of the sliding guide up to the end blocking. The end blocking, instead of being provided in the sliding guide, may also be provided on the surface on which the sliding guide is mounted. When using the sliding guide in, for instance, an arm support, the end blocking, for instance a stop, may be provided on the console, in line with the second profile.

According to a further elaboration of the invention, the sliding guide may be provided with locking means to lock the first and the second profile with respect to each other in a desired position between a starting position and the maximum sliding distance. Such locking means can for instance enable a stepped or stepless adjustment of the first profile relative to the second profile. A stepped adjustment can for instance be achieved with the aid of different notches, openings or suchlike means provided in the longitudinal direction of one of the profiles, and with the aid of a, for instance resilient, element provided on the other profile, for instance the earlier-mentioned stop, which can fall into the notches, or openings. By exerting extra force in the displacement direction of the first profile, the spring means may be displaced from a first opening to one of the next openings. Further, it is possible, according to a further elaboration of the invention, that the adjustment can be realized by means of an internal or external operating element. Also other kinds of locking means may be provided in the sliding guide to allow the first profile to be locked with respect to the second profile in a desired position.

The invention furthermore relates to an arm support for a vehicle, for instance a passenger car, provided with an above-described sliding guide, wherein the sliding guide is provided between a base, for instance a console, and an arm support slidable relative to the console.

In the further subclaims, further advantageous embodiments are described of a sliding guide according to the invention, as well as an arm support equipped therewith.

BRIEF DESCRIPTION OF THE DRAWINGS

In clarification, exemplary embodiments of a sliding guide according to the invention will be further elucidated with reference to the drawings. In the drawings.

DETAILED DESCRIPTION OF THE INVENTION

Figure 1:
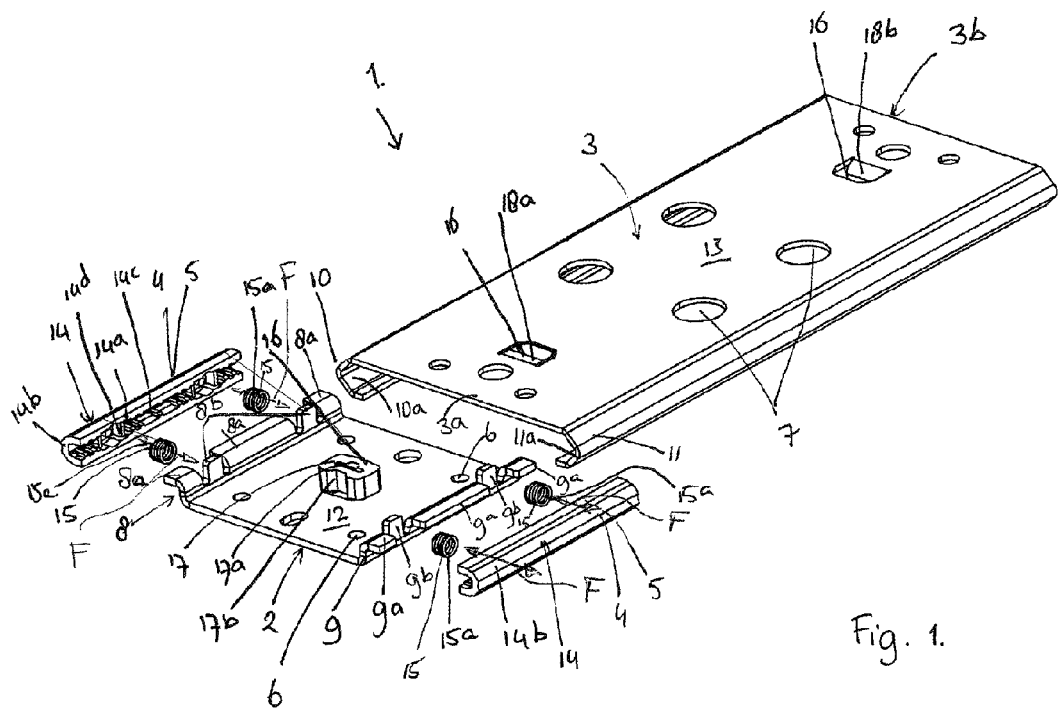
FIG. 1 shows in perspective view a sliding guide according to the invention in non-assembled condition.

In this description, the same or corresponding parts have the same or corresponding reference numerals. In the exemplary embodiments shown in the drawing, in each case only two profiles are shown for a two-part sliding guide. It will be clear, however, that in a comparable manner, simply, also a sliding guide can be manufactured having for instance three profiles, for instance by including in a conventional manner between the first and second profiles shown in the drawing a third and optionally next profile with associated bearing means and friction means. Such a sliding guide, as will be immediately clear to the skilled person, provides a greater slide-out length of the sliding guide. In a sliding guide according to this description, preferably use is made of at least a slide bearing for a first and second profile. In embodiments of a guide according to this description, preferably use is made of at least one sliding element which extends between a first and a second profile and enables a relative movement, in a first direction. The at least one sliding element is preferably biased by spring means in a direction including an angle with the first direction and preferably substantially at right angles thereto. To this end, for instance, springs may be provided between one of the first and second profile and the sliding element, which springs have a force direction which is directed approximately at right angles to the first direction, preferably approximately parallel to a main surface of said first and/or second profile. The force direction is preferably directed as normal to a guide surface of the sliding element. Preferably, a sliding element is then so biased in said direction that the sliding element provides a self-setting system for the guide in that the sliding element can at least partly be pressed away from a guide surface cooperating therewith of a respective profile, through direct engagement of the spring means. To that end, a sliding element may for instance be suspended with the aid of the spring means in a manner allowing it to swerve to some extent. By the use of spring means that allow a movement of a sliding element not only in a direction of the normal to the respective cooperating guide surfaces but also in at least one direction including an angle therewith and with the first direction, the self-setting property can be augmented still further.

In FIG. 1 the different parts of a sliding guide 1 according to the invention are shown in a non-assembled condition. The sliding guide 1 comprises a first profile 2 provided with a profile central surface 12 and two connecting longitudinal edges 8, 9 extending substantially transversely to the profile central surface 12. The connecting longitudinal edges 8, 9 comprise several segments 8a, 8b; 9a, 9b, viewed in the longitudinal direction of the profile 2. The first segments 8a, 9a contain an outwardly directed end which is arranged to cooperate with a sliding element 14. The second segments 8b, 9b extend in whole substantially perpendicularly to the profile central surface 12 and are configured to cooperate with a spring connection 15. The first profile 2 has a relatively small length. A second profile 3 is provided with a greater length. Also the second profile 3 comprises a profile central surface 13 and two connecting longitudinal edges 10, 11 extending substantially transversely thereto. The connecting longitudinal edges 10, 11 of the second profile 3 have a substantially V-shaped cross section, which tapers in a direction R1 pointing away from the first profile 2, viewed in assembled condition (see FIG. 2). In another embodiment of the invention, the cross section of the respective connecting longitudinal edge 10, 11 of the second profile 3 can have a different shape converging to some extent in the direction R1, such as a semicircular shape, so that the sliding element 14 is properly positioned against the connecting longitudinal edges 10, 11 in order to minimize, or even prevent, play. Also, it is possible that the cross section of the connecting longitudinal edges 10, 11 converges in the direction from the second profile 3 to the first profile 2.

Figure 3:
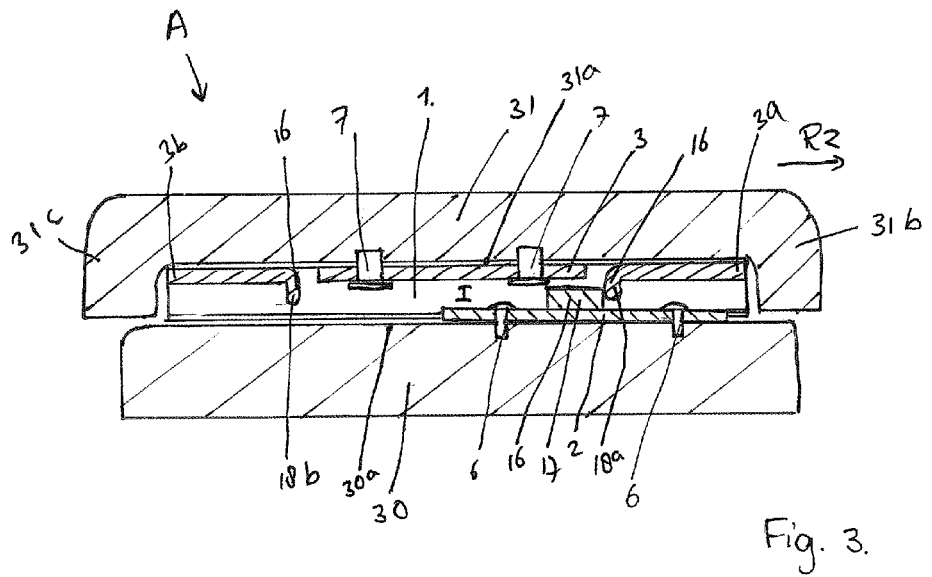
FIG. 3 shows a longitudinal sectional view of an arm support provided with the sliding guide according to the invention in a starting position.
Figure 4:
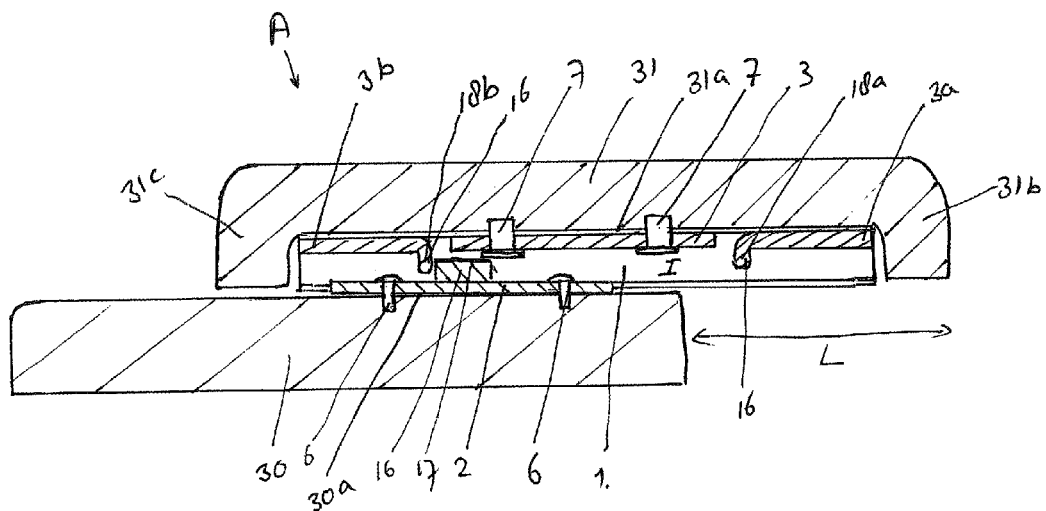
FIG. 4 shows a longitudinal sectional view of an arm support provided with the sliding guide according to the invention in an extended position.

Both profiles 2, 3 are provided with fastening means 6, 7 for fastening the profiles 2, 3 to respective surfaces 30a, 31a, situated opposite thereto, as can be seen better in FIGS. 3 and 4. The fastening means 6, 7 in this exemplary embodiment of the invention comprise a number of holes through which for instance screws, bolts and the like can be inserted to form the actual fastening with the surfaces 30a, 31a. It is clear that in another embodiment of the sliding guide 1 according to the invention other fastening means can be used, such as for instance user-specific fastenings which can cooperate with fastening means which are already provided on the surfaces onto which the respective profiles 2, 3 are to be fastened. Further, the sliding guide 1 comprises an end blocking 16 which prevents the second profile 3 from being slid further than a maximum sliding distance L relative to the first profile 2 (see FIG. 4). The end blocking 16 comprises a stop 17 of a damping material such as rubber which is provided on the profile central surface 12 of the first profile 2. The stop 17 extends from the profile central surface 12 in the direction of the profile central surface 13 of the second profile. The second profile 3 is provided with two projections 18a, 18b, which are provided near the ends 3a, 3b of the second profile 3 and extend in the direction of the profile central surface 12 of the first profile 2.

Figure 2:
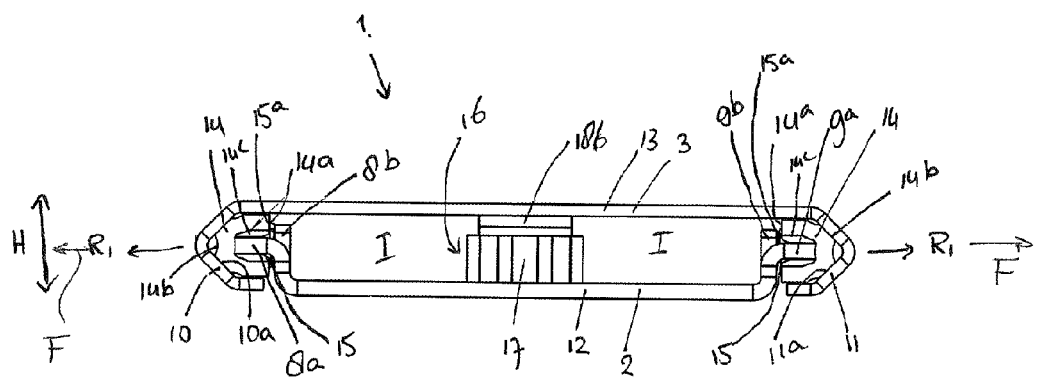
FIG. 2 shows a cross sectional view of the sliding guide according to the invention in assembled condition.

Referring to FIGS. 1 and 2, it will be described hereinbelow how the sliding guide 1 according to an embodiment of the invention can be assembled in a simple manner. The profiles 2, 3 can for instance be manufactured by blanking the discrete profile parts from a plate of, for instance, metal, after which the connecting longitudinal edges 8, 9; 10, 11 can be formed by flanging opposite edges on both sides of the respective profile parts. The profiles 2, 3 can have different dimensions, while the length of the two profiles 2, 3 can be tailored to a desired maximum sliding distance L of the second profile 3 relative to the first profile 2. Also, in a simple manner, the external width dimension of the sliding guide 1, and hence of the respective profiles 2, 3, may be varied. Adaptations in the dimensions of the profiles 2, 3 are relatively simple and this does not change the working principle of the sliding guide 1. Preferably, the first profile 2 has a shorter length than the second profile 3. In an alternative embodiment of the invention, also other ways of manufacturing the profiles 2, 3, which are clear to the skilled person, can be applied. The projections 18a, 18b are provided on the profile central surface 13 of the second profile 3 by folding partly blanked material over in a same direction as in which the connecting longitudinal edges 10, 11 extend. It is convenient when prior to assembly only one of the projections 18a, 18b has been formed so that the first profile 2 can be easily slid into the second profile 3. A base 17a of the stop 17 is manufactured similarly to the projections 18a, 18b, after which a rubber damping element 17b is slipped over the base 17a. The stop 17 and the projections 18a, 18b together form the end blocking 16. It is clear to the skilled person that the end blocking 16 in another embodiment of the sliding guide 1 according to the invention may be constructed in a different manner to achieve a same purpose. For instance, the projections 18a, 18b and/or the stop 17 may be provided at other locations on the respective profiles 2, 3.

The sliding elements 14 can be made of a plastic and can be manufactured using an injection molding process. Each sliding element 14 comprises a first side 14a which is configured for cooperation with the first segments 8a, 9a of the connecting longitudinal edge 8, 9 of the first profile 2. For this purpose, the first side 14a can comprise notches 14c in which the outwardly directed ends of the first segments 8a can be received. Further, the first side 14a comprises spring receiving elements 14d, against which the springs 15a of the spring connection s 15 can be placed. Each sliding element 14 further comprises a second side 14b provided with an outer surface which is configured to cooperate with an inner surface 10a, 11a of a connecting longitudinal edge 10, 11 of the second profile 3.

After the manufacture of the individual parts of the sliding guide 1 according to the exemplary embodiment of the invention shown in the figures, the sliding guide 1 is assembled. For this, the springs 15a are placed by a first end thereof in the spring receiving means 14d of the sliding elements 14. Next, the sliding elements 14, at least the notches 14c thereof, are slipped over the first segments 8a, 9a of the connecting longitudinal edges 8, 9 of the first profile 2. The springs 15c then come to lie by a second end thereof against the second segments 8b, 9b of the connecting longitudinal edges 8, 9. The sliding elements 14 are pressed inwards, that is, moved towards each other, after which the first profile 2 can be slid into the second profile 3. When the stop 17 has passed the closest projection 18a, still to be formed, that projection 18a can also be formed by bending the partly blanked material in a same direction as the projection 18b already formed earlier. Of course, it is possible that the different parts are manufactured in a different manner and are mounted in a different manner, whereby the sliding guide 1 according to the invention is obtained. The sliding guide 1 can then be used in a desired application, as in an arm support A provided in a vehicle (see FIGS. 3 and 4).

In assembled condition of the sliding guide 1, as can be properly seen in FIG. 2, the sliding elements 14, which form the bearing means 4 and friction means 5, are provided near the respective connecting longitudinal edges 8, 9; 10, 11 of the first profile 2 and the second profile 3. Further, the connecting longitudinal edges 8, 9; 10, 11 extend from the respective profile central surface 12, 13 in a direction towards the opposite profile central surface 12, 13. In this way, an internal space I between the first 2 and second 3 profile is provided. This internal space I makes it possible to add additional parts to the sliding guide 1 without thereby augmenting the height H of the sliding guide 1. The spring connection s 15 with which the first sides 14a of the sliding elements 14 are connected to the connecting longitudinal edges 8, 9 ensure that a certain frictional resistance between the first profile 2 and the second profile 3 is present. By varying the type of spring connection 15, the magnitude of the frictional resistance can be determined. This can be done inter alia by varying the type of spring 15a and/or the number of springs 15a. It is also possible, instead of a spring connection 15, to provide a layer of grease having a particular viscosity between an inner surface 10a, 11a of the connecting longitudinal edges 10, 11 of the second profile 3 and an outer surface of the sliding element 14. Also, other conceivable manners of clamping the first profile 2, bearing-mounted and provided with a frictional resistance, in the second profile 3. Other aspects such as surface roughness of the different parts, material use of the different parts etc. can also play a role in the magnitude of the frictional resistance.

As can be seen in FIG. 2 the outer surface of each second side 14b of each sliding element 14 abuts in a substantially form-closed manner against the opposite inner surface 10a, 11a of the respective connecting longitudinal edge 10, 11 of the second profile 3. In this way, a positioning of the sliding element 14 with respect to the connecting longitudinal edges 10, 11 of the second profile 3 is obtained that obviates, at least reduces, play between these parts in directions in the plane of the section. In FIG. 1 on each side of the first profile two springs 15 are represented. Naturally, there may also be more. The springs 15, here designed as compression springs, have an action direction F. In the embodiments shown and described here, the springs are so arranged that the action directions F of the different springs are located approximately in one plane, parallel to each other. For each spring 15 it holds that the action direction F preferably extends approximately at right angles to the sliding direction or displacement direction R2, for instance as a normal to a longitudinal direction L of the sliding elements 14, for instance approximately parallel to the arrow R1 in FIG. 2. Springs 15 which jointly engage a sliding element 14, spaced from each other, will hence bias the respective sliding element outwards, away from each other and from the first profile 2, against a guide of the second profile 3. Through the different springs 15 a first end of the sliding element can assume a position closer to or further away from the first profile 2 than the opposite end, while moreover the whole sliding element can be pressed farther or less far away from the first profile 2. As a result, unevennesses and irregularities on or of the cooperating sliding elements and guides of the second profile can be simply taken up, while yet a desired pressure and guidance can always be preserved. Moreover, when the guides do not extend wholly parallel to each other, these differences too can relatively simply be taken up. Moreover, wear is simply compensated for.

The above-described sliding guide 1 works as follows when used in an arm support A for in a vehicle. Here, reference is made to FIGS. 3 and 4. The sliding guide 1 is fastened between the console 30 and an arm support 31 situated opposite thereto. For this, the first profile 2 is mounted, with the aid of the fastening means 6 on a top surface 30a of the console 30 at a desired location on the top surface 30a. The second profile 3 is fastened with the aid of fastening means 7 to a bottom surface 31a of the arm support 31.

When a driver of a car wishes to use the arm support A and wishes to adjust it to his personal preference, the driver can displace the arm support 31 relative to the console 30 in a displacement direction R2. As a result, the second profile 3 slides with a constant frictional resistance of, for instance, 20-30 Newton in the displacement direction R2 until the second profile 3 has been displaced relative to the first profile 2 over a sliding distance L at a maximum. The maximum sliding distance L is reached when the projection 18b, provided at an end 3b of the second profile 3 located near the rear side 31c of the arm support, strikes against the stop 17. When the arm support 31 is slid in a direction opposite to the displacement direction R2, the arm support 31 will go back to the starting position again, with the projection 18a provided near the front side 31b of the arm support 31 striking against the stop 17 when the starting position has been reached.

In another embodiment of the invention, not shown, the sliding guide 1 may further be provided with locking means to lock the first profile 2 and the second profile 3 with respect to each other at a desired position between the starting position and the maximum extended position. This can for instance take place in a stepped or stepless manner.

The invention is not in any way limited to the exemplary embodiments shown in the description and the drawing. All combinations of (parts of) embodiments described and/or shown are understood to fall within the concept of the invention. Moreover, many variations thereon are possible within the framework of the invention as set forth in the appended claims.

For instance, instead of a single first profile 2, several first profiles 2 may be provided in the second profile 3 in longitudinal direction L in line with each other. This is convenient for use of the sliding guide 1 according to the invention in other applications such as for instance in sliding doors, vertical applications, dusty environments, light machine guide systems, etc. Also, several sliding elements 14 may be provided between the first 2 and the second profile 3 and several springs 15a may be provided to press the sliding elements 14 against an inner surface 10a, 10b of the connecting longitudinal edges 10, 11 of the second profile 3.

The invention claimed is:

1. A sliding guide comprising:
at least a first and at least a second profile slidable relative thereto in a longitudinal direction, with bearing means and friction means included between the first profile and the second profile for providing a frictional resistance between the first profile and the second profile during sliding,
wherein the profiles are provided with means for fastening the profiles to respective surfaces situated opposite thereto,
wherein the first and second profiles on both sides in the longitudinal direction are provided with respective connecting longitudinal edges, which cooperate in order to allow sliding of the second profile relative to the first profile,
wherein the bearing means and the friction means are provided between the profiles near the respective connecting longitudinal edges thereof in order to provide an internal space between the at least first and the at least second profile, and
wherein the at least one connecting longitudinal edge of the second profile has a substantially V-shaped cross section.

2. A sliding guide according to claim 1, wherein the respective connecting longitudinal edges of the first and of the second profile extend at least partly from a profile central surface substantially to the profile situated opposite thereto.

3. A sliding guide according to claim 1, wherein the bearing means comprise at least one sliding element, wherein the at least one sliding element is provided between at least one connecting longitudinal edge of the first profile and the connecting longitudinal edge of the second profile situated opposite thereto.

4. A sliding guide according to claim 1, wherein the bearing means and the friction means are integrated in at least one sliding element.

5. A sliding guide according to claim 1, wherein the substantially V-shaped cross section of the at least one connecting longitudinal edge of the second profile tapers in a direction remote from the first profile.

6. A sliding guide according to claim 3, wherein the at least one sliding element has a first side facing the first profile, which is connected with the connecting longitudinal edge of the first profile via a spring connection.

7. A sliding guide according to claim 3, wherein the at least one sliding element has a side facing an inner surface of the connecting longitudinal edge of the second profile, which side is situated substantially against the inner surface and is configured for sliding cooperation with the inner surface.

8. A sliding guide according to claim 7, wherein an outer surface of the side of the sliding element abuts in a substantially form-closed manner against the inner surface of the connecting longitudinal edge of the second profile.

9. A sliding guide according to claim 3, wherein the sliding element is connected with an inner surface of the second profile via a spring connection, wherein a side of the sliding element facing the first profile is configured for slidingly receiving the first profile, at least the connecting longitudinal edge thereof, at least partly.

10. A sliding guide comprising:
at least a first profile and at least a second profile slidable relative thereto in a longitudinal direction, with bearing means and friction means included between the first profile and the second profile for providing a frictional resistance between the first profile and the second profile during sliding, and wherein:
the profiles are provided with means for fastening the profiles to respective surfaces situated opposite thereto;
the first and second profiles on both sides in the longitudinal direction are provided with respective connecting longitudinal edges, which cooperate in order to allow sliding of the second profile relative to the first profile;
the bearing means and the friction means are provided between the profiles near the respective connecting longitudinal edges thereof in order to provide an internal space between the at least first profile and the at least second profile;
the at least one connecting longitudinal edge of the second profile has a substantially V-shaped cross section that tapers in a direction remote from the first profile; and
the frictional resistance between the first profile and the second profile is settable.

11. A sliding guide according to claim 1, wherein the sliding guide is provided with at least one end blocking which determines a maximum sliding distance of the second profile relative to the first profile.

12. A sliding guide according to claim 11, wherein at least one of the profiles is provided with at least one stop, of rubber, and wherein the profile situated opposite thereto is provided with at least one projection situated opposite the at least one stop.

13. A sliding guide according to claim 1, wherein the sliding guide is provided with locking means to lock the first and second profile with respect to each other in a desired position between a starting position and the maximum sliding distance.

14. An arm support for a vehicle provided with a sliding guide according to claim 1, wherein the sliding guide is provided between a base, and an arm support slidable relative to the base.

15. A sliding guide according to claim 1, further comprising intermediate sliding bearing means which comprise sliding profiles, which by means of springs are biased with respect to one of the profiles in the direction of the other one of the profiles, wherein the springs each have an action direction, wherein springs which are situated on both sides of the first profile have parallel action directions, the arrangement being such that the sliding profiles are self-setting and a sliding profile can be brought with a first end at a distance from one of the profiles that is different from a distance at which an opposite second end of the respective sliding profile is situated from the same profile.

16. A sliding guide comprising:
at least a first profile and at least a second profile slidable relative thereto in a longitudinal direction, with bearing means and friction means included between the first profile and the second profile for providing a frictional resistance between the first profile and the second profile during sliding, and wherein:
the profiles are provided with means for fastening the profiles to respective surfaces situated opposite thereto;
the first and second profiles on both sides in the longitudinal direction are provided with respective connecting longitudinal edges, which cooperate in order to allow sliding of the second profile relative to the first profile;

the bearing means and the friction means are provided between the profiles near the respective connecting longitudinal edges thereof in order to provide an internal space between the at least first and the at least second profile;

the respective connecting longitudinal edges of the first profile and of the second profile extend at least partly from a profile central surface substantially to the profile situated opposite thereto;

the bearing means comprise at least one sliding element, wherein the at least one sliding element is provided between at least one connecting longitudinal edge of the first profile and the connecting longitudinal edge of the second profile situated opposite thereto;

the bearing means and the friction means are integrated in at least one sliding element;

the at least one connecting longitudinal edge of the second profile has a substantially V-shaped cross section, which tapers in a direction remote from the first profile;

the at least one sliding element has a first side facing the first profile, which is connected with the connecting longitudinal edge of the first profile via a spring connection;

the at least one sliding element has a second side facing an inner surface of the connecting longitudinal edge of the second profile, which second side is situated substantially against the inner surface and is configured for sliding cooperation with the inner surface;

an outer surface of the second side of the sliding element abuts in a substantially form-closed manner against the inner surface of the connecting longitudinal edge of the second profile; and the sliding element is connected with an inner surface of the second profile via a spring connection, wherein a side of the sliding element facing the first profile is configured for slidingly receiving the first profile, at least the connecting longitudinal edge thereof, at least partly.

17. A sliding guide according to claim 16, wherein the sliding guide is provided with at least one end blocking which determines a maximum sliding distance of the second profile relative to the first profile;

at least one of the profiles is provided with at least one stop, of rubber, and wherein the profile situated opposite thereto is provided with at least one projection situated opposite the at least one stop; and the sliding guide is provided with locking means to lock the first profile and second profile with respect to each other in a desired position between a starting position and the maximum sliding distance.

18. An arm support for a vehicle provided with a sliding guide according to claim 16, wherein the sliding guide is provided between a base and an arm support slidable relative to the base.

19. An arm support for a vehicle provided with a sliding guide according to claim 17, wherein the sliding guide is provided between a base and an arm support slidable relative to the base.

20. A sliding guide according to claim 16, wherein a first and a second profile slidable therealong are provided, with intermediate sliding bearing means which comprise sliding profiles, which by means of springs are biased with respect to one of the profiles in the direction of the other one of the profiles, wherein the springs each have an action direction, wherein springs which are situated on both sides of a first profile have parallel action directions, the arrangement being such that the sliding profiles are self-setting and a sliding profile can be brought with a first end at a distance from one of the profiles that is different from a distance at which an opposite second end of the respective sliding profile is situated from the same profile.

21. A sliding guide according to claim 17, further comprising intermediate sliding bearing means which comprise sliding profiles, which by means of springs are biased with respect to one of the profiles in the direction of the other one of the profiles, wherein the springs each have an action direction, wherein springs which are situated on both sides of the first profile have parallel action directions, the arrangement being such that the sliding profiles are self-setting and a sliding profile can be brought with a first end at a distance from one of the profiles that is different from a distance at which an opposite second end of the respective sliding profile is situated from the same profile.

22. An arm support according to claim 14, wherein the vehicle comprises a passenger car.

23. An arm support according to claim 14, wherein the base comprises a console.

24. An arm support according to claim 18, wherein the vehicle comprises a passenger car.

25. An arm support according to claim 18, wherein the base comprises a console.

26. An arm support according to claim 19, wherein the vehicle comprises a passenger car.

27. An arm support according to claim 19, wherein the base comprises a console.

* * * * *

UNITED STATES PATENT AND TRADEMARK OFFICE
CERTIFICATE OF CORRECTION

PATENT NO. : 8,534,733 B2
APPLICATION NO. : 13/002385
DATED : September 17, 2013
INVENTOR(S) : Schreurs et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 234 days.

Signed and Sealed this
Fifteenth Day of September, 2015

Michelle K. Lee
*Director of the United States Patent and Trademark Office*